US010260787B2

(12) United States Patent
Walden et al.

(10) Patent No.: US 10,260,787 B2
(45) Date of Patent: Apr. 16, 2019

(54) REFRIGERATION SYSTEM AND METHOD FOR AUTOMATED CHARGING AND START-UP CONTROL

(71) Applicant: Hill Phoenix, Inc., Conyers, GA (US)

(72) Inventors: Matthew W. Walden, Covington, GA (US); Thomas W. Bradshaw, Las Vegas, NV (US); Peter J. Ferretti, Monroe, GA (US); Niel M. Hayes, Conyers, GA (US); Senthilkumar Kandappa Goundar Shanmugam, Smyrna, GA (US)

(73) Assignee: Hill Phoenix, Inc., Conyers, GA (US)

( * ) Notice: Subject to any disclaimer, the term of this patent is extended or adjusted under 35 U.S.C. 154(b) by 0 days.

(21) Appl. No.: 15/587,931

(22) Filed: May 5, 2017

(65) Prior Publication Data
US 2017/0336113 A1 Nov. 23, 2017

Related U.S. Application Data

(60) Provisional application No. 62/338,152, filed on May 18, 2016.

(51) Int. Cl.
F25B 45/00 (2006.01)
F25B 41/06 (2006.01)
(Continued)

(52) U.S. Cl.
CPC .............. F25B 45/00 (2013.01); F25B 41/04 (2013.01); F25B 41/062 (2013.01); F25B 49/02 (2013.01);
(Continued)

(58) Field of Classification Search
CPC ...... F25B 45/00; F25B 41/062; F25B 49/022; F25B 2345/003; F25B 41/04;
(Continued)

(56) References Cited

U.S. PATENT DOCUMENTS 5,784,892 A 7/1998 Reedy
2007/0006602 A1* 1/2007 Hayashi .............. F24D 19/1072
62/190
(Continued)

FOREIGN PATENT DOCUMENTS

EP 2 587 193 5/2013
EP 2 921 326 1/2015

OTHER PUBLICATIONS

Extended European Search Report for application No. 17169965.5, dated Sep. 20, 2017, 7 pages.

Primary Examiner — Melvin Jones
(74) Attorney, Agent, or Firm — Foley & Lardner LLP

(57) ABSTRACT

A system for starting a refrigeration system includes a liquid line regulating valve, a liquid line charging valve, a suction line expansion valve, a suction line charging valve, and a controller. The controller is configured to override normal operation of the refrigeration system and transmit a demand signal to enable partial system operation. The controller is configured to operate the liquid line regulating valve and the liquid line charging valve to charge a receiver tank, gradually increase the demand signal to a predetermined level of partial system operation, and release the liquid line charging valve to normal operation. The controller is configured to operate the suction line expansion valve and the suction line charging valve to charge a suction line, gradually increase the demand signal to full system operation, and release the liquid line regulating valve, the suction line expansion valve, and the suction line charging valve to normal operation.

20 Claims, 5 Drawing Sheets

(51) Int. Cl.
*F25B 49/02* (2006.01)
*F25B 41/04* (2006.01)
(52) U.S. Cl.
CPC ...... *F25B 49/022* (2013.01); *F25B 2345/003* (2013.01); *F25B 2400/075* (2013.01); *F25B 2400/19* (2013.01); *F25B 2500/24* (2013.01); *F25B 2500/26* (2013.01); *F25B 2600/23* (2013.01); *F25B 2600/2513* (2013.01); *F25B 2600/2523* (2013.01); *F25B 2700/15* (2013.01); *F25B 2700/1933* (2013.01); *F25B 2700/21151* (2013.01); *F25B 2700/21163* (2013.01)
(58) Field of Classification Search
CPC ............ F25B 2400/075; F25B 2400/19; F25B 2500/24; F25B 2500/26; F25B 2600/2513; F25B 2600/2523; F25B 2600/23; F25B 2700/15; F25B 2700/1933; F25B 2700/21151; F25B 2700/21163
See application file for complete search history.

(56) References Cited

U.S. PATENT DOCUMENTS

| | | | |
|---|---|---|---|
| 2008/0190130 A1* | 8/2008 | Murakami | F25B 13/00 62/324.3 |
| 2009/0049857 A1* | 2/2009 | Murakami | F25B 13/00 62/324.6 |
| 2015/0052914 A1* | 2/2015 | Leman | F25B 49/02 62/79 |

* cited by examiner

REFRIGERATION SYSTEM AND METHOD FOR AUTOMATED CHARGING AND START-UP CONTROL

CROSS-REFERENCE TO RELATED PATENT APPLICATION

This application claims the benefit of and priority to U.S. Provisional Patent Application No. 62/338,152 filed May 18, 2016, the entire disclosure of which is incorporated by reference herein.

BACKGROUND

The present disclosure relates generally to a refrigeration system. The present disclosure relates more particularly to an automated charging and start-up method for a refrigeration system which does not require input from a technician.

Refrigeration systems are often used to provide cooling to temperature controlled display devices (e.g. cases, merchandisers, etc.) in supermarkets and other similar facilities. Vapor compression refrigeration systems are a type of refrigeration system which provide such cooling by circulating a fluid refrigerant (e.g., a liquid and/or vapor) through a thermodynamic vapor compression cycle. In a vapor compression cycle, the refrigerant is typically (1) compressed to a high temperature/pressure state (e.g., by a compressor of the refrigeration system), (2) cooled/condensed to a lower temperature state (e.g., in a gas cooler or condenser which absorbs heat from the refrigerant), (3) expanded to a lower pressure (e.g., through an expansion valve), and (4) evaporated to provide cooling by absorbing heat into the refrigerant.

Start-up and installation of a refrigeration system traditionally requires a service technician to go through a step-by-step process to charge the system with refrigerant. These methods can be inefficient and inexperienced technicians may damage the system and result in wasted energy or suboptimal system performance.

SUMMARY

One implementation of the present disclosure is a system for starting a refrigeration system after installation includes a liquid line regulating valve, a liquid line charging valve, a suction line expansion valve, and a suction line charging valve. The system includes a controller configured to override normal operation of the refrigeration system and transmit a demand signal to the refrigeration system to enable partial system operation. The controller is further configured to operate the liquid line regulating valve and the liquid line charging valve, in response to a demand signal, to charge a receiver tank. The controller is configured to gradually increase the demand signal to a predetermined level of partial system operation, and release the liquid line charging valve to normal operation. The controller is configured to operate the suction line expansion valve and the suction line charging valve, in response to a demand signal, to charge a suction line, gradually increase the demand signal to full system operation, and release the liquid line regulating valve, the suction line expansion valve, and the suction line charging valve to normal operation.

In some embodiments, the controller is further configured to cycle one or more compressors of the refrigeration system to control a suction pressure in the refrigeration system. In other embodiments, the controller is further configured to monitor the refrigeration system for a low refrigerant condition. In some embodiments, the low refrigerant condition is a low suction pressure, a low superheat reading, a low refrigerant temperature, a low refrigerant flow rate, or a low refrigerant level.

In some embodiments, the controller is further configured to suspend the increase of the demand signal based on a low refrigerant condition. In other embodiments, the controller is further configured to calculate a period of time for which the increase of the demand signal was suspended.

In some embodiments, the controller is further configured to decrease the demand signal based on the low refrigerant condition and the period of time. In other embodiments, the controller is further configured to monitor the refrigeration system for a plurality of power source conditions including at least one of a power failure, a partial loss of power, and a phase loss.

In some embodiments, the controller is further configured to restart operations based on the plurality of power source conditions.

In some embodiments, the controller is further configured to vary the demand signal based on a ramp rate value. In other embodiments, the ramp rate value is set based on at least one of a user input and a plurality of refrigerant conditions.

Another implementation of the present disclosure is a method for starting a refrigeration system after installation. The method includes overriding normal operation of the refrigeration system, and transmitting a demand signal to the refrigeration system to enable partial system operation. The method further includes operating a liquid line regulating valve and a liquid line charging valve, in response to a demand signal, to charge a receiver tank, gradually increasing the demand signal to a predetermined level of partial system operation, and releasing the liquid line charging valve to normal operation. The method includes operating a suction line expansion valve and a suction line charging valve, in response to a demand signal, to charge a suction line, gradually increasing the demand signal to full system operation, and releasing the liquid line regulating valve, the suction line expansion valve, and the suction line charging valve to normal operation.

In some embodiments, the method includes cycling one or more compressors of the refrigeration system to control a suction pressure in the refrigeration system. In other embodiments, the method includes monitoring the refrigeration system for a low refrigerant condition. In some embodiments, the low refrigerant condition is a low suction pressure, a low superheat reading, a low refrigerant temperature, a low refrigerant flow rate, or a low refrigerant level.

In some embodiments, the method includes suspending the increase of the demand signal based on the low refrigerant condition. In other embodiments, the method includes calculating a period of time for which the increase of the demand signal was suspended.

In some embodiments, the method includes decreasing the demand signal based on the low refrigerant condition and the period of time. In other embodiments, the method includes monitoring the refrigeration system for a plurality of power source conditions including at least one of a power failure, a partial loss of power, and a phase loss.

In some embodiments, the method includes restarting operations based on the plurality of power source conditions.

In some embodiments, the method includes varying the demand signal based on a ramp rate value. In other embodiments, the ramp rate value is set based on at least one of a user input and a plurality of refrigerant conditions.

Yet another implementation of the present disclosure is a controller including a memory and one or more processors. The processors are configured to override normal operation of the refrigeration system, and transmit a demand signal to the refrigeration system to enable partial system operation. The processors are further configured to operate the liquid line regulating valve and the liquid line charging valve, in response to a demand signal, to charge a receiver tank, gradually increase the demand signal to a predetermined level of partial system operation, and release the liquid line charging valve to normal operation. The processors are configured to operate the suction line expansion valve and the suction line charging valve, in response to a demand signal, to charge a suction line, gradually increase the demand signal to full system operation, and release the liquid line regulating valve, the suction line expansion valve, and the suction line charging valve to normal operation.

In some embodiments, the processors are further configured to monitor the refrigeration system for a low refrigerant condition. The processors are configured to calculate a period of time for which the increase of the demand signal is suspended, and suspend the increase of the demand signal based on the plurality of refrigerant conditions for the period of time. In some embodiments, the low refrigerant condition is a low suction pressure, a low superheat reading, a low refrigerant temperature, a low refrigerant flow rate, or a low refrigerant level.

In some embodiments, the one or more processors are further configured to decrease the demand signal based on the low refrigerant condition and the period of time.

In some embodiments, the processors are further configured to monitor the refrigeration system for a plurality of power source conditions including at least one of a power failure, a partial loss of power, and a phase loss, and restart operations based on the plurality of power source conditions.

In some embodiments, the processors are further configured to vary the demand signal based on a ramp rate value. In other embodiments, the ramp rate value is set based on at least one of a user input and a plurality of refrigerant conditions.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a refrigeration system and components thereof are shown, according to various exemplary embodiments. The refrigeration system may be a vapor compression refrigeration system. In some implementations, the refrigeration system may be used to provide cooling for temperature controlled display devices in a supermarket or other similar facility.

In some embodiments, the refrigeration system includes a receiving tank (e.g., a flash tank, a refrigerant reservoir, etc.) containing refrigerant, a condenser assembly, a compressor assembly, an accumulator, and a subcooler assembly. The refrigeration system includes a controller for monitoring and controlling the pressure, temperature, and/or flow of the refrigerant throughout the refrigeration system. The controller can operate each of the assemblies (e.g., according to the various control processes described herein) to efficiently regulate the pressure of the refrigerant within the receiving tank. Additionally, the controller can interface with other instrumentation associated with the refrigeration system (e.g., measurement devices, timing devices, pressure sensors, temperature sensors, etc.) and provide appropriate control signals to a variety of operable components of the refrigeration system (e.g., compressors, valves, power supplies, flow diverters, etc.) to regulate the pressure, temperature, and/or flow at other locations within the refrigeration system. Advantageously, the controller may be used to facilitate efficient operation of the refrigeration system, reduce energy consumption, and improve system performance.

Before discussing further details of the refrigeration system and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, transmission of forces, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
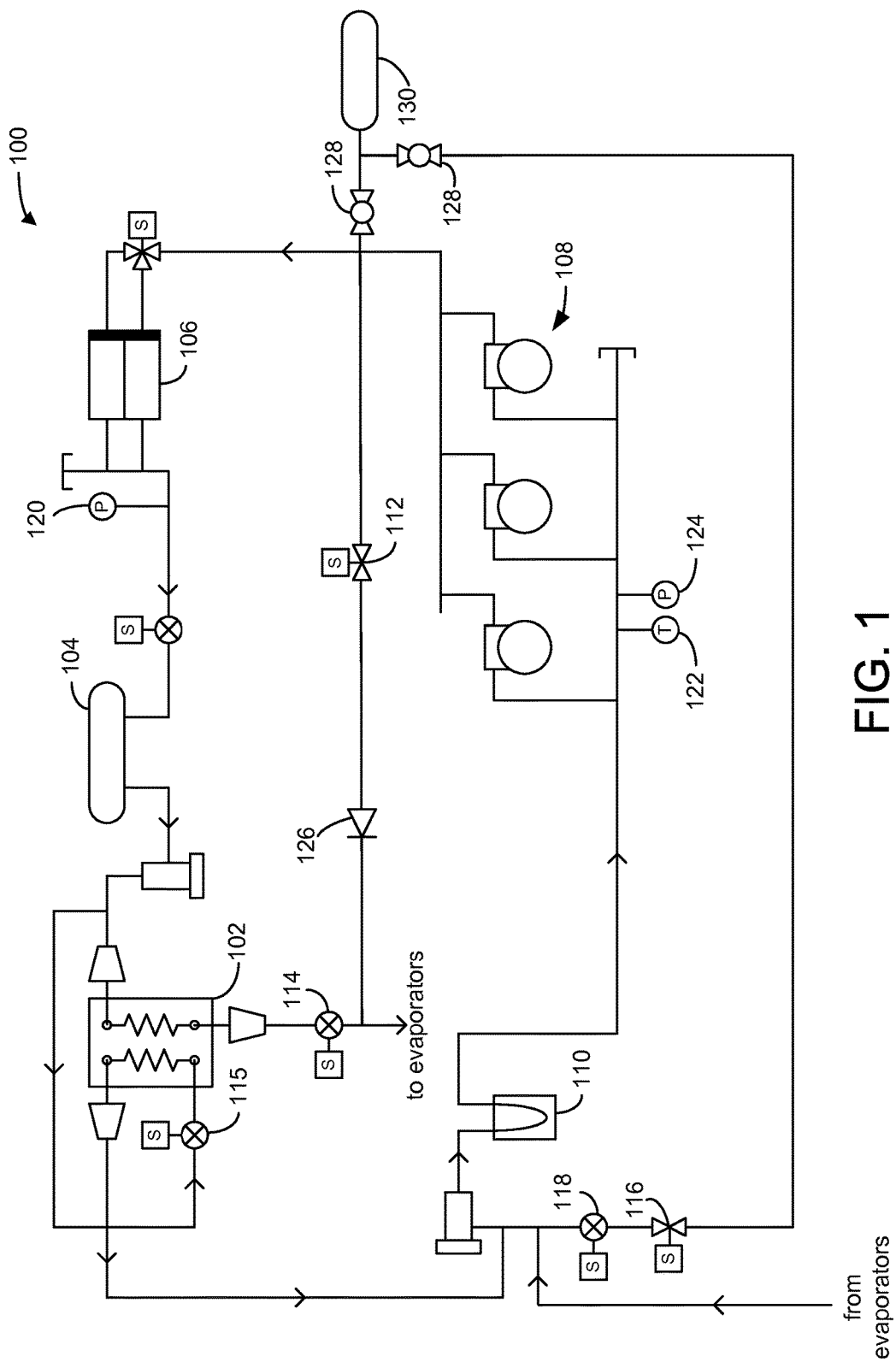
FIG. 1 is a schematic representation of a refrigeration system having a refrigeration circuit, a subcooler assembly, a receiving tank, a condenser assembly, a compressor assembly, and an accumulator assembly, according to an exemplary embodiment.

Referring now to FIG. 1, a refrigeration system 100 is shown according to an exemplary embodiment. Refrigeration system 100 may be a vapor compression refrigeration system. Refrigeration system 100 is shown to include a system of pipes, conduits, or other fluid channels for transporting the refrigerant between various thermodynamic components of the refrigeration system. The thermodynamic components of refrigeration system 100 are shown to include a subcooler 102, receiver tank 104, condenser assembly 106, compressor assembly 108, accumulator 110, and refrigerant tank 130. Refrigeration system 100 is also shown to include a liquid line charging solenoid valve 112, a liquid line regulating/electronic expansion valve 114, subcooler electronic expansion valve 115, a suction line charging solenoid valve 116, and a suction line electronic expansion valve 118. Refrigeration system 100 is further shown to include drop leg/condensing pressure transducer 120, a suction temperature transducer 122, and a suction pressure transducer 124.

Accumulator 110 prevents compressor damage from a sudden surge of liquid refrigerant and oil that could enter compressor assembly 108 from the suction line. Accumulator 110 is a temporary reservoir for the refrigerant and oil mixture, and is designed to meter the liquid refrigerant and oil back to compressor assembly 108 at a predefined rate. The flow rate to compressor assembly 108 may be calculated to prevent damage to the valves, pistons, rods, and crankshafts. Accumulator 110 may have a metering ejector device that picks up liquid, vaporizes it, and returns it to compressor assembly 108. Accumulator 110 prevents liquid slugging and controls oil return. In some embodiments, accumulator 110 may receive vapor refrigerant from the evaporators of refrigeration system 100.

Compressor assembly 108 may compress the refrigerant into a superheated vapor. In some embodiments, the compressor assembly may be a medium temperature assembly. In other embodiments, compressor assembly 108 may be a low temperature assembly, or may be a split suction assembly with both medium temperature and low temperature portions. The output pressure from compressor assembly 108 may vary depending on ambient temperature and other operating conditions. In some embodiments, compressor assembly 108 operates in a transcritical mode. In operation, the refrigerant discharge gas may exit compressor assembly 108 and flow through piping of the system into condenser assembly 106.

Compressors of compressor assembly 108 may be arranged in parallel with other compressors of compressor assembly 108. Any number of parallel compressors may be present. Compressor assembly 108 may be fluidly connected with condenser assembly 106. When active, compressors of compressor assembly 108 compress the vapor received from accumulator 110 and discharge the compressed vapor to condenser assembly 106.

Condenser assembly 106 may include one or more heat exchangers or other similar devices for removing heat from the refrigerant. In some embodiments, condenser assembly 106 partially or fully condenses refrigerant vapor into liquid refrigerant (e.g., if system operation is in a subcritical region). The condensation process may result in fully saturated refrigerant liquid or a liquid-vapor mixture (e.g., having a thermodynamic quality between 0 and 1). In other embodiments, condenser assembly 106 may cool the refrigerant vapor (e.g., by removing superheat) without condensing the refrigerant vapor into refrigerant liquid (e.g., if system operation is in a supercritical region). In some embodiments, the cooling/condensation process is an isobaric process. Condenser assembly 106 is shown outputting the cooled and/or condensed refrigerant to receiver tank 104.

Receiver tank 104 collects the refrigerant from condenser assembly 106. In some embodiments, receiver tank 104 may be a flash tank or other fluid reservoir. Receiver tank 104 includes a liquid portion and a vapor portion and may contain a partially saturated mixture of liquid and vapor refrigerant. In some embodiments, receiver tank 104 separates the liquid refrigerant from the vapor refrigerant. The liquid refrigerant may exit receiver tank 104 toward subcooler 102. The vapor refrigerant may exit receiver tank 104 through a separate conduit (not shown).

Subcooler expansion valve 115, shown to the left of subcooler 102, is a flow restricting device that causes a pressure drop of the refrigerant. Subcooler expansion valve 115 may cause the refrigerant to expand to a low temperature, low pressure state. The low temperature, low pressure characteristics induced in the refrigerant at subcooler expansion valve 115 allow the heat in the refrigerant to flow from right to left, as shown in FIG. 1. The flow of heat from right to left provides additional cooling for the refrigerant that flows down from subcooler 102 toward liquid line regulating valve 114. Subcooler 102 allows heat to flow from the refrigerant at a higher pressure (liquid), to the one with lower pressure (gas). Subcooler 102 delivers refrigerant to liquid line regulating valve 114.

Liquid line regulating valve 114 may regulate several properties of refrigeration system 100, including the pressure and flow rate of refrigerant. In some embodiments, liquid line regulating valve 114 is a stepper valve. Liquid line regulating valve 114 may expand the subcooled refrigerant, which is provided to the evaporators of refrigeration system 100. In some embodiments, subcooled refrigerant may also pass through a check valve 126 and one or more isolation ball valves 128 as it is provided to accumulator 110. Refrigerant tank 130. is shown to the right of isolation ball valves 128. Refrigerant tank 130 may be regulated via isolation ball valves 128, and may receive excess refrigerant exiting subcooler 102 and supply additional refrigerant to accumulator 110.

Liquid line charging solenoid valve 112 and suction line charging solenoid valve 116 are electronically operated devices. Solenoid valves 112 and 116 control the flow of liquids or gases in a positive, fully-closed or fully-open mode. Solenoid valves are commonly used to replace manual valves or where remote control is desirable. A solenoid valve is operated by opening and closing a channel in the valve body that permits or prevents flow through the valve. The channel is opened or closed using a plunger that is raised or lowered in a tube. Solenoid valves may be operated by energizing the coil of the solenoid.

Liquid line regulating/electronic expansion valve 114 and suction line electronic expansion valve 118 may be electronic expansion valves or other similar expansion valves. Expansion valves 114 and 118 may not be adjustable, and may act as bottle necks or restrictors in refrigeration system 100. In other embodiments, expansion valves 114 and 118 are variably adjustable (e.g., by a controller) between an open and closed position. Expansion valves 114 and 118 may cause the refrigerant to undergo a rapid drop in pressure, thereby expanding the refrigerant to a lower pressure, lower temperature state. The expansion process may be an isenthalpic and/or adiabatic expansion process. In some embodiments, expansion valves 114 and 118 may expand the refrigerant to a lower pressure than charging or regulating valves alone, thereby resulting in a lower temperature refrigerant.

Suction line expansion valve 118 may vaporize any liquid refrigerant so that only vapor refrigerant is provided to compressor assembly 108. The presence of condensed liquid flowing into a compressor could be detrimental to system performance. Suction line expansion valve 118 may ensure that the refrigerant flowing into the compressor (e.g., from the upstream suction side thereof) has a sufficient superheat (e.g., degrees above the temperature at which the refrigerant begins to condense) to ensure that no liquid refrigerant is present.

Drop leg pressure transducer 120, suction temperature transducer 122 and suction pressure transducer 124 may be any kind of transducers. Transducers generally convert one type of energy to another, and are commonly used as sensors when physical quantities such as heat and pressure are converted to electrical signals. Transducers 120, 122, and 124 may be used in combination for superheat protection (i.e., ensuring that only vapor refrigerant is provided to the compressors) and to monitor the condition of the refrigerant in the suction line. Transducers 120, 122, and 124 may be installed in the piping of refrigeration system 100.

Figure 2:
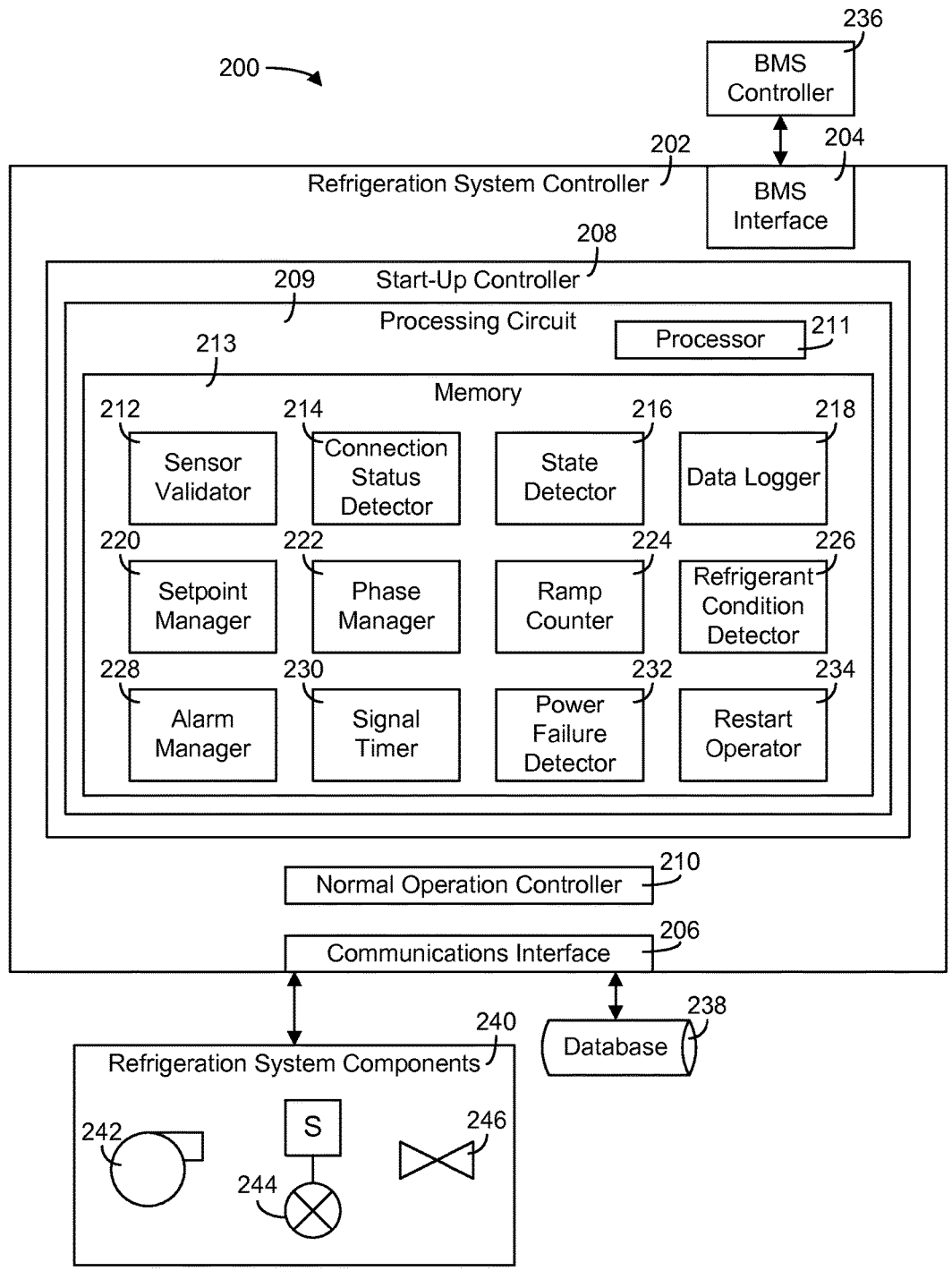
FIG. 2 is a block diagram of a refrigeration system controller for the system of FIG. 1 and associated components, according to an exemplary embodiment.

Referring now to FIG. 2, a block diagram 200 of a refrigeration system controller of the system of FIG. 1 and associated components is shown, according to an exemplary embodiment. Block diagram 200 is shown to include refrigeration system controller 202. Refrigeration system controller 202 is shown to include a BMS interface 204, a communications interface 206, a start-up controller 208, and a normal operation controller 210. Block diagram 200 is also shown to include a BMS circuit controller 236, a database 238, and a set of refrigeration system components 240.

Refrigeration system controller 202 includes start-up controller 208 and normal operation controller 210. Controller 202 may receive electronic data signals from various instrumentation or devices within refrigeration system 100. For example, controller 202 may receive data input from timing devices, measurement devices (e.g., pressure sensors, temperature sensors, flow sensors, etc.), and user input devices (e.g., a user terminal, a remote or local user interface, etc.). Controller 202 may use the input to determine appropriate control actions for one or more devices of refrigeration system 100. For example, controller 202 may provide output signals to operable components (e.g., valves, power supplies, flow diverters, compressors, etc.) to control a state or condition (e.g., temperature, pressure, flow rate, power usage, etc.) of system 100.

In some embodiments, controller 202 may be configured to operate regulating valves, expansion valves, compressor assemblies, condenser assemblies, etc. In some embodiments, controller 202 may regulate or control the refrigerant pressure within condenser assembly 106 by operating a high pressure valve. Advantageously, controller 202 may operate high pressure valves in coordination with gas bypass valves and/or other operable components of refrigeration system 100 to facilitate improved control functionality and maintain a proper balance of refrigerant pressures, temperatures, flow rates, or other quantities (e.g., measured or calculated) at various locations throughout system 100.

Controller 202 may receive electronic data signals from one or more measurement devices (e.g., pressure sensors, temperature sensors, flow sensors, etc.) located within refrigeration system components 240. Controller 202 may use the input signals to determine appropriate control actions for control devices of refrigeration system 100 (e.g., compressors, valves, flow diverters, power supplies, etc.).

Controller 202 may receive a setpoint (e.g., a temperature setpoint, a pressure setpoint, a flow rate setpoint, a power usage setpoint, etc.) and operate one or more components of system 100 to achieve the setpoint. The setpoint may be specified by a user (e.g., via a user input device, a graphical user interface, a local interface, a remote interface, etc.) or automatically determined by controller 202 based on a history of data measurements.

Controller 202, which includes start-up controller 208 and operation controller 210, may be a proportional-integral (PI) controller, a proportional-integral-derivative (PID) controller, a pattern recognition adaptive controller (PRAC), a model recognition adaptive controller (MRAC), a model predictive controller (MPC), or any other type of controller employing any type of control functionality. In some embodiments, controller 202 is a local controller for refrigeration system 100. In other embodiments, controller 202 is a supervisory controller for a plurality of controlled subsystems (e.g., a refrigeration system, an AC system, a lighting system, a security system, etc.). For example, controller 202 may be a controller for a comprehensive building management system incorporating refrigeration system 100. Controller 202 may be implemented locally, remotely, or as part of a cloud-hosted suite of building management applications.

Refrigeration system controller 202 is shown to include a communications interface 206. Communications interface 206 can be or include wired or wireless interfaces (e.g., jacks, antennas, transmitters, receivers, transceivers, wire terminals, etc.) for conducting electronic data communications. For example, communications interface 206 may be used to conduct data communications with valves, compressors, condensers, various data acquisition devices within refrigeration system 100 (e.g., temperature sensors, pressure sensors, flow sensors, etc.) and/or other external devices or data sources. Data communications may be conducted via a direct connection (e.g., a wired connection, an ad-hoc wireless connection, etc.) or a network connection (e.g., an Internet connection, a LAN, WAN, or WLAN connection, etc.). For example, communications interface 206 can include an Ethernet card and port for sending and receiving data via an Ethernet-based communications link or network. In another example, communications interface 206 can include a WiFi transceiver or a cellular or mobile phone transceiver for communicating via a wireless communications network.

Still referring to FIG. 2, start-up controller 208 is shown to have processing circuit 209, including a processor 211 and memory 213. Processor 211 can be implemented as a general purpose processor, an application specific integrated circuit (ASIC), one or more field programmable gate arrays (FPGAs), a group of processing components, a microcontroller, or other suitable electronic processing components. Memory 213 (e.g., memory device, memory unit, storage device, etc.) may be one or more devices (e.g., RAM, ROM, solid state memory, hard disk storage, etc.) for storing data and/or computer code for completing or facilitating the various processes, layers and modules described in the present application.

Memory 213 may be or include volatile memory or non-volatile memory. Memory 213 may include database components, object code components, script components, or any other type of information structure for supporting the various activities and information structures described in the present application. According to an exemplary embodiment, memory 213 is communicably connected to processor 211 via processing circuit 209 and includes computer code for executing (e.g., by processing circuit 209 and/or processor 211) one or more processes described herein. Memory 213 is shown to include a sensor validator 212, a connection status detector 214, a state detector 216, and a data logger 218. Memory 213 is further shown to include a setpoint manager 220, a phase manager 222, a ramp counter 224, a refrigerant condition detector 226, an alarm manager 228, a signal timer 230, a power failure detector 232, and a restart operator 234.

Sensor validator 212 may confirm that all sensors and/or transducers are reading within range (no sensors are shorted or open circuited) and that all sensors are operating properly.

Sensor validator 212 may prevent refrigeration system 100 from operating and/or may prevent the start-up process (e.g., process 300) from continuing if improper sensor operation is detected. For example, improper operation of drop leg/condensing pressure transducer 120, suction temperature transducer 122, and suction pressure transducer 124 of FIG. 1 may prevent refrigeration system 100 from operating properly. Sensor validator 212 may ensure that these sensors are operating properly to facilitate proper system operation. Sensor validator 212 may communicate with data logger 218 to obtain sensor readings. In some embodiments, sensor validator 212 may compare sensor readings with benchmark readings for the operating conditions to determine whether a sensor is operating normally. For example, benchmark readings may be stored in database 238, and sensor validator 212 may access database 238 to compare current sensor readings with benchmark readings. Sensor validator 212 may communicate directly with sensors through BMS interface 204 or communications interface 206 to receive sensor readings. In some embodiments, sensor validator 212 may read current sensor readings from memory 213 or database 238.

Connection status detector 214 may determine whether a connection with the building management system (BMS) coupled to refrigeration system 100 is active. In some embodiments, connection status detector 214 confirms the connection is active by evaluating the status of BMS interface 204. For example, if BMS interface 204 is offline, connection status detector 214 may determine that the BMS connection is not active. Connection status detector 214 may determine whether the BMS connection is active by attempting to transmit a signal to the BMS. In some embodiments, connection status detector 214 may set a value of a variable associated with the connection status in memory 213 or database 238. Connection status detector 214 may raise a flag with the status of the connection. For example, connection status detector 214 may flag the status of the connection as offline. In some embodiments, the start-up process will not begin until the connection is online. In other embodiments, the start-up process will be delayed.

State detector 216 may determine the state of circuit controllers in refrigeration system 100. State detector 216 may confirm that the BMS has established communications with controllers of refrigeration system components 240. In some embodiments, state detector 216 communicates with connection status detector 214 to determine whether controllers of refrigeration system components 240 have communicated with the BMS. For example, state detector 216 may determine whether the controllers are in a ready state by communicating with each controller through BMS interface 204 or communications interface 206. In some embodiments, state detector 216 may set a value of a variable associated with the state of controllers of refrigeration system components 240 in memory 213 or database 238. State detector 216 may raise a flag with the state of controllers of refrigeration system components 240. In some embodiments, refrigeration system 100 may not proceed with current operations until state detector 216 has indicated that each controller of refrigeration system components 240 is in a ready state.

Data logger 218 may include instructions for receiving (e.g., via communications interface 206) pressure information, temperature information, flow rate information, or other measurements (i.e., "measurement information" or "measurement data") from one or more measurement devices of refrigeration system 100. In some embodiments, the measurements may be received as an analog data signal. Data logger 218 may include an analog-to-digital converter for translating the analog signal into a digital data value. Data acquisition module may segment a continuous data signal into discrete measurement values by sampling the received data signal periodically (e.g., once per second, once per millisecond, once per minute, etc.). In some embodiments, the measurement data may be received as a measured voltage from one or more measurement devices. Data logger 218 may convert the voltage values into pressure values, temperature values, flow rate values, or other types of digital data values using a conversion formula, a translation table, or other conversion criteria.

In some embodiments, data logger 218 may convert received data values into a quantity or format for further processing by start-up controller 208. For example, data logger 218 may receive data values indicating an operating position of liquid line charging solenoid valve 112. This position may be used to determine the flow rate of refrigerant through liquid line charging solenoid valve 112, as such quantities may be proportional or otherwise related. Data logger 218 may include functionality to convert a valve position measurement into a flow rate of the refrigerant through the valve.

In some embodiments, data logger 218 outputs current data values for the pressure within receiver tank 104, the temperature at the outlet of condenser assembly 106, the valve position or flow rate through any valves, or other data values corresponding to other measurement devices of refrigeration system 100. In some embodiments, data logger 218 stores the processed and/or converted data values in a local memory 213 of start-up controller 208 or in a remote database 238 such that the data may be retrieved and used by start-up controller 208.

In some embodiments, data logger 218 may attach a time stamp to the received measurement data to organize the data by time. If multiple measurement devices are used to obtain the measurement data, data logger 218 may assign an identifier (e.g., a label, tag, etc.) to each measurement to organize the data by source. For example, the identifier may signify whether the measurement information is received from a temperature sensor located at an outlet of condenser assembly 106, a temperature or pressure sensor located within receiver tank 104, etc. Data logger 218 may further label or classify each measurement by type (e.g., temperature, pressure, flow rate, etc.) and assign appropriate units to each measurement (e.g., degrees Celsius (° C.), Kelvin (K), bar, kilo-Pascal (kPa), pounds force per square inch (psi), etc.). Data logger may store user information associated with the user providing commands to refrigeration system 100 through communications interface 206. Data logger 218 may store information such as name, location, authorization level, etc. In some embodiments, data logger 218 may record a time stamp corresponding to the time at which a command or process is executed. For example, when start-up mode begins, or when a memory module executes.

Database 238 may be any kind of remote storage, and may store configuration settings for refrigeration system 100. Such configuration settings may include control parameters used by controllers 208 and 210 (e.g., proportional gain parameters, integral time parameters, setpoint parameters, etc.), translation parameters for converting received data values into temperature or pressure values, system parameters for a stored system model of refrigeration system 100 (e.g., as may be used for implementations in which controllers 208 and 210 use a model predictive control methodology), or other parameters as may be referenced by various memory modules 212-234 in performing the various control processes described herein.

Setpoint manager 220 may control setpoints for refrigeration system 100. Setpoints may be desired operating ranges or points. Setpoints may be controlled by a user of refrigeration system 100. Setpoint manager 220 may accept input from communications interface 206. Setpoint manager 220 may communicate with refrigeration system components 240 directly through communications interface 206. Setpoint manager 220 may communicate with refrigeration system components 240 through BMS circuit controller 236. Setpoint manager 220 may control setpoints for relevant variables which may not be controlled by refrigeration system components 240. For example, setpoint manager 220 may control the temperature setpoint for a zone in which refrigeration system 100 is installed.

Phase manager 222 may inform refrigeration system 100 and a user of refrigeration system 100 of the phase of operation refrigeration system controller 202 is currently executing. Phase manager 222 may store phase information in memory 213 or a remote database 238. For example, phase manager 222 may store information that refrigeration system 100 has completed the receiver pre-charging phase and is entering the suction charging phase. In some embodiments, phase manager 222 may store a value corresponding to a phase. In other embodiments, phase manager 222 may change the value of a variable stored in memory 213 or database 238 which is associated with the phase of refrigeration system 100. For example, phase manager 222 may access database 238 to change the value of a variable REF_SYS_PHS from RPC (receiver pre-charge) to SCP (suction charging phase).

Ramp counter 224 may count up or count down and effect a corresponding change in the demand signal sent to refrigeration system controller 202. For example, ramp counter 224 may count from 0 to 100, where each scalar maps to a percentage of the demand signal. In some embodiments, the demand signal does not represent the percentage of physical circuits that are demanded, but rather represents the percentage of the total system capacity demanded. Ramp counter 224 may count up, which causes the demand signal to increase, or may count down, which causes the demand signal to decrease. Ramp counter 224 allows the demand signal to gradually (e.g., continuously or incrementally) increase or decrease, reducing strain put on refrigeration components 240 which may occur when demand is suddenly increased or decreased.

Still referring to FIG. 2, memory 213 is shown to include a refrigerant condition detector 226. Refrigerant condition detector 226 may ensure that the refrigerant flowing into a compressor (e.g., compressor assembly 108) contains no condensed liquid refrigerant, as the presence of condensed liquid flowing into a compressor could be detrimental to system performance. Refrigerant condition detector 226 may ensure that the refrigerant flowing into the compressor (e.g., from the upstream suction side thereof) has a sufficient superheat (e.g., degrees above the temperature at which the refrigerant begins to condense) to ensure that no liquid refrigerant is present.

In some embodiments, refrigerant condition detector 226 monitors a current temperature "$T_{suction}$" and/or pressure "$P_{suction}$" of the refrigerant flowing into a compressor. The current temperature $T_{suction}$ and/or pressure $P_{suction}$ may be determined by data logger 218 and stored in a local memory 213 of start-up controller 208 or in a remote database 238 accessible by start-up controller 208. Refrigerant condition detector 226 may compare the current temperature $T_{suction}$ with a threshold temperature value "$T_{threshold}$" stored in database 238. The threshold temperature value $T_{threshold}$ may be based on a temperature "$T_{condensation}$" at which the refrigerant begins to condense into a liquid-vapor mixture at the current pressure $P_{suction}$. For example, $T_{threshold}$ may be a fixed number of degrees "$T_{superheat}$" above $T_{condensation}$ (e.g., $T_{threshold}=T_{condensation}+T_{superheat}$). In an exemplary embodiment, $T_{superheat}$ may be approximately 10K (Kelvin) or 10° C. In other embodiments, $T_{superheat}$ may be approximately 5K, approximately 15K, approximately 20K, or within a range between 5K and 20K. Refrigerant condition detector 226 may prevent activation of the compressor associated with the temperature measurement if $T_{suction}$ is less than $T_{threshold}$.

In some embodiments, refrigerant condition detector 226 monitors a current temperature "$T_{outlet}$" of the refrigerant exiting condenser assembly 106. Refrigerant condition detector 226 may ensure that the refrigerant exiting condenser assembly 106 has the ability to provide sufficient superheat to the refrigerant flowing into compressor assembly 108. The current temperature $T_{outlet}$ may be determined by data logger 218 and stored in a local memory 213 of start-up controller 208 or in a remote database 238 accessible by start-up controller 208. Refrigerant condition detector 226 may compare the current temperature $T_{outlet}$ with a threshold temperature value "$T_{threshold\_outlet}$" stored in database 238. The threshold temperature value $T_{threshold\_outlet}$ may be based on the temperature $T_{condensation}$ at which the refrigerant begins to condense into a liquid-vapor mixture at the current pressure suction $P_{suction}$ for compressor assembly 108. In some embodiments, the threshold temperature value $T_{threshold}$ may be based on an amount of heat predicted to transfer (e.g., using a heat exchanger efficiency, a temperature differential between $T_{outlet}$ and $T_{suction}$, etc.). Refrigerant condition detector 226 may prevent activation of compressor assembly 108 if $T_{outlet}$ is less than $T_{threshold}$.

Refrigerant condition detector 226 may monitor refrigerant conditions such as refrigerant temperature, refrigerant flow rate, refrigerant pressure, etc. and communicate with alarm manager 228. In some embodiments, refrigerant condition detector 226 may raise an alarm for conditions such as low superheat, low refrigerant temperature, low flow rate, low pressure, etc. Refrigerant condition detector 226 may set a variable associated with each condition. Refrigerant condition may store the condition in memory 213 or database 238. Refrigerant condition detector 226 may communicate with alarm manager 228 to raise an alarm. For example, refrigerant condition detector 226 may detect low suction pressure in refrigeration system 100. Refrigerant condition detector 226 may communicate with alarm manager 228 to set an alarm for low suction pressure. In other embodiments, refrigerant condition detector 226 may not communicate with alarm manager 228 and may flag the condition. For example, refrigerant condition detector 226 may flag a variable associated with suction pressure as being in a low state. Refrigeration system controller 202 may base control decisions on any variables in memory 213 or database 238, and may evaluate each variable prior to executing commands or processes.

Alarm manager 228 may activate, escalate, de-escalate, deactivate, etc. alarms for refrigeration system 100. Alarm manager 228 may alert a user to undesirable conditions occurring in refrigeration system 100. For example, alarm manage 228 may set an alarm if one or more of the monitored refrigerant conditions are too low (e.g., below a threshold). In some embodiments, if an alarm is active, refrigeration system 100 may not proceed with ongoing activity. For example, if an alarm is active, the start-up procedure of the present disclosure may be halted until the alarm is cleared. Alarms may be raised, cleared, etc. by a user of refrigeration system 100. In some embodiments, a user may override an alarm. A user may ignore the alarm, or a user may clear the alarm. In some embodiments, alarm manager 228 and refrigerant condition detector 226 are combined in one module.

Signal timer 230 may record temporal data for any signal transmitted or received by refrigeration system controller 202. In some embodiments, signal timer 230 may record the length of time that the demand signal to refrigeration system 100 has been delayed during the new start-up process discussed in the present disclosure. Signal timer 230 may keep a running clock. For example, signal timer 230 may start counting when the demand signal has been delayed, and may run until the delay has ceased. Signal timer 230 may keep multiple running clocks. In some embodiments, signal timer 230 may track the length of any process. Signal timer 230 may record the start time in memory 213 or remote database 238 and calculate the total time using the stop time. In some embodiments, signal timer 230 communicates with data logger 218 to record timestamps or to access temporal data. For example, signal timer 230 may store a timestamp for the start time of a delay of the demand signal in database 238. Refrigeration system controller 202 may request the total time that the demand signal has been delayed at present. Signal timer 230 may calculate the total time of delay by accessing database 238 to compare the current time to the stored start timestamp. In some embodiments, signal timer 230 and data logger 218 are combined in one module.

Power failure detector 232 may determine that a power failure, or similar event, has occurred. Power failure detector 232 may detect power failures, brown-outs, phase losses, etc. In some embodiments, power failure detector 232 detects conditions requiring a restart of refrigeration system 100 has occurred. For example, power failure detector 232 may detect that a single refrigeration component 240 has experienced a power failure. Power failure detector 232 may determine that a power failure, or similar event, has occurred based on amount of time during which power was lost, an amount of power lost, etc. For example, if refrigeration system 100 has experienced a loss of 3 kW, power failure detector 232 may determine that a power failure has occurred. Power failure detector 232 may be able to detect component errors and initiate a restart of refrigeration system 100. For example, if power failure detector 232 has determined that a compressor of compressor assembly 108 has lost connection through BMS interface 204 or communications interface 206, power failure detector 232 may determine that a restart of refrigeration system 100 is necessary.

Memory 213 is shown to include restart operator 234. Restart operator 234 may execute the process of FIG. 6 in the case that power failure detector 232 has detected a condition requiring a restart. For example, restart operator 234 may restart refrigeration system 100 if a temporary loss of power occurs for 15 minutes. Restart operator 234 may simply contain computer-readable instructions for executing the restart process. In some embodiments, restart operator 234 may be a separate controller. Restart operator 234 may override start-up controller 208 and normal operation controller 210. Restart operator 234 may block signals from start-up controller 208 and normal operation controller 210. Restart operator 234 may set its priority higher than start-up controller 208 and normal operation controller 210. Operation of restart operator 234 is described in detail in the discussion of FIG. 6.

Normal operation controller 210 may control operation of refrigeration system 100 after the start-up phase or restart phase is complete. Normal operation controller 210 may operate valves 112-118, condensers 106, and compressor assembly 108 during normal operation. During the start-up process, refrigeration system 100 may override normal operation controller 210. In some embodiments, start-up controller 208 overrides normal operation controller 210. In other embodiments, refrigeration system controller 202 may simply send normal operation controller 210 into a standby mode. In some embodiments, refrigeration system controller 202 may block the signal from normal operation controller 210 to each of refrigeration system components 240. In other embodiments, refrigeration system controller 202 may set a priority for each command and/or message from start-up controller 208 over all controllers, such as normal operation controller 210.

Referring still to FIG. 2, refrigeration system components 240 is shown to include exemplary components. Refrigeration system components 240 may include any of the set of components in refrigeration system 100, as described with reference to FIG. 1. For example, refrigeration system components 240 may include compressor 242, expansion valve 244, and solenoid valve 246. Refrigeration system components 240 may also include components not shown in FIG. 2, such as condensers, accumulators, suction filters, subcoolers, etc. Refrigeration system components 240 may be communicably coupled to refrigeration system controller 202 through communications interface 206. Refrigeration system components 240 may receive command data and send information to refrigeration system controller 202 through communications interface 206.

Figure 3:
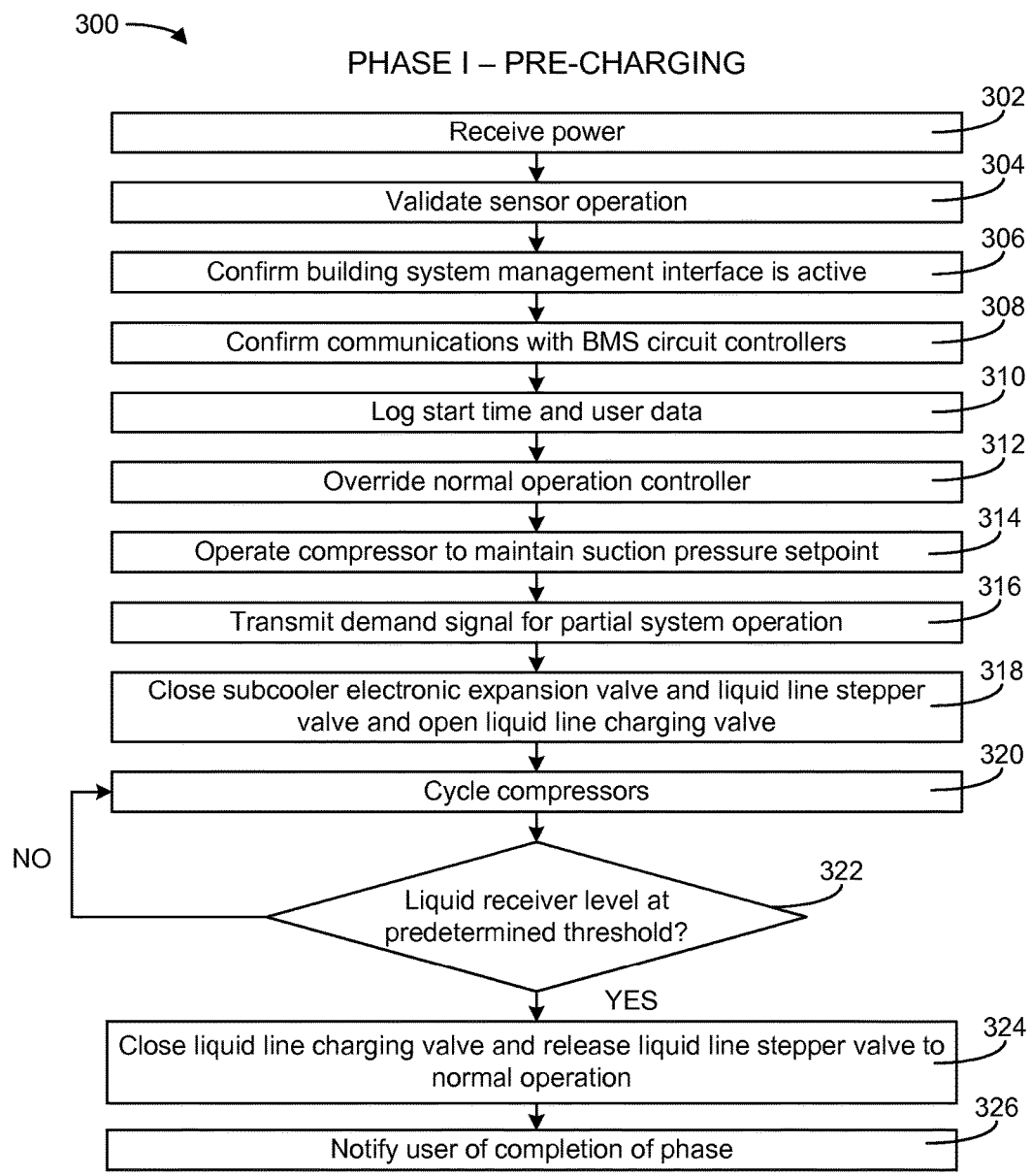
FIG. 3 is a flowchart of a process for pre-charging the receiver of the refrigeration system of FIG. 1, according to an exemplary embodiment.

Referring now to FIG. 3, a process 300 for pre-charging a receiver tank of a refrigeration system as part of a start-up method is shown, according to an exemplary embodiment. Prior to the beginning of process 300, several procedures may be completed. For example, full factory end-of-line testing may be completed. End-of-line testing may include debugging, product quality assurance, component testing, assembly testing, system testing, etc. Refrigeration system 100 may have been triple evacuated, and all transducers may have been re-installed. A check may have been performed to ensure that the contractor or technician has used the correct refrigerant for charging system 100, and that system 100 is connected to the charging ports and ready for start-up.

In some embodiments, electronic circuit controllers may be used by refrigeration system 100. Electronic circuit controllers may have been verified as properly set-up for operation. A check may have been performed to ensure that a building management system (BMS) is communicably coupled to refrigeration system 100 and/or refrigeration system controller 202. A connected BMS may have commanded all circuits of refrigeration system 100 to enter a standby or off position.

Process 300 begins with step 302, in which system 100 of FIG. 1 receives power. Power may be received from any source, and may be provided from a facility in which system 100 is installed. In some embodiments, process 300 may be initiated when power is received by refrigeration system controller 202 of FIG. 2.

Referring still to FIG. 3, process 300 may continue upon receiving power after all previous testing and procedures have been completed. Refrigeration system 100 may conduct a self-check, beginning with step 304, in which refrigeration system controller 202 validates sensor operation of refrigeration system 100. A component of refrigeration system 100 such as sensor validator 212 may perform step 304. In some embodiments, refrigeration system 100 may confirm that all sensors and/or transducers are reading within range (no sensors are shorted or open circuited). Some sensors may prevent refrigeration system 100 from operating or process 300 from continuing if their readings are out of range. For example, improper operation of drop leg/condensing pressure transducer 120, suction temperature transducer 122, and suction pressure transducer 124 of FIG. 1 may prevent refrigeration system 100 from operating properly. Accordingly, ensuring that these sensors are functioning properly may ensure proper system operation.

Once refrigeration system 100 has confirmed that relevant sensors are functioning properly, process 300 may continue with step 306, in which refrigeration system 100 confirms BMS interface 204 of FIG. 2 is active. In some embodiments, refrigeration controller 202 confirms BMS interface 204 is active. In other embodiments, a component of refrigeration controller 202, such as connection status detector 214, may perform step 306. The communications protocol used may be any building management system protocol, such as BACnet, LonWorks, Modbus, ZigBee, etc. The communications protocol may be any wireless communications protocol, such as WiFi, Bluetooth, NFC, etc. In some embodiments, refrigeration system 100 may confirm that interface 204 is active by checking that the connection to BMS circuit controller 236 of FIG. 2 is active. For example, refrigeration system 100 may confirm that BMS interface 204 is active by checking that the BACnet connection to BMS circuit controller 236 is active. In some embodiments, process 300 may not continue until the connection is online.

Process 300 may continue with step 308, in which refrigeration system 100 confirms that the building management system has established communications with circuit controllers, and that they are in a ready state. In some embodiments, refrigeration system controller 202 confirms that BMS circuit controller 236 has established communications with circuit controllers, and that they are in a ready state. In other embodiments, a component of refrigeration system controller 202, such as state detector 216, may perform step 308. Refrigeration system 100 may not allow process 300 to proceed until circuit controllers are in a ready state or refrigeration system 100 receives an indication of an "OK" status. For example, refrigeration system 100 may not allow process 300 to proceed until circuit controllers transmit a signal indicating they are ready for the receiver pre-charge phase.

Process 300 may continue once refrigeration system 100 has completed its self-check procedure and all criteria have been met. The next step of process 300, step 310, may include logging a start time and any relevant user data for the receiver pre-charge phase. In some embodiments, step 310 may be performed by a component of refrigeration system controller 202, such as data logger 218. The start time may be saved in database 238 of FIG. 2. In some embodiments, the start time is saved as a timestamp. The start time may be saved permanently, and may be used in future decision making.

Referring still to FIG. 3, process 300 may continue with step 312, in which refrigeration system 100 may override normal operation controller 210. In some embodiments, refrigeration system controller 202 includes a start-up controller 208 which overrides normal operation controller 210. Refrigeration system controller 202 may simply send normal operation controller 210 into a standby mode. In some embodiments, refrigeration system controller 202 may block the signal from normal operation controller 210 to each of refrigeration system components 240. In other embodiments, refrigeration system controller 202 may set a priority for each command and/or message from start-up controller 208 over all controllers, such as normal operation controller 210.

Process 300 may continue with step 314, in which refrigeration system 100 operates a compressor to maintain a suction setpoint. Setpoints may be managed and set by a user through setpoint manager 220. In some embodiments, step 314 is performed by refrigeration system controller 202. Refrigeration system 100 may operate a single compressor to maintain the suction setpoint. The suction setpoint may maintain a certain suction pressure and/or temperature in refrigeration system 100. In some embodiments, refrigeration system 100 may operate more than one compressor if required to reach the suction setpoint.

Process 300 may continue with step 316, in which refrigeration system 100 may send a demand signal to a building management system for partial system operation. For example, refrigeration system 100 may send a demand signal for 10% of system operation. The demand signal may be sent by refrigeration system controller 202, through BMS interface 204 to BMS circuit controller 236. In some embodiments, BMS circuit controller 236 may enable 10% of the circuits in refrigeration system 100 based on total design capacity, not percentage of circuit quantity. For example, if one circuit of eight hundred circuits provides 10% of total system capacity, the one circuit may be enabled.

Process 300 may continue with step 318, in which refrigeration system 100 may close subcooler electronic expansion valve 115 and liquid line regulating valve 114 and open liquid line charging solenoid valve 112. Closing subcooler electronic expansion valve 115 and liquid line regulating valve 114 and opening liquid line charging solenoid valve 112 may cause refrigerant to accumulate in receiver tank 104. Subcooler electronic expansion valve 115 and liquid line regulating valve 114 each represent an outlet through which refrigerant may flow. Opening liquid line charging solenoid valve 112 may allow refrigerant to flow into receiver tank 104, while closing subcooler electronic expansion valve 115 and liquid line regulating valve 114 may prevent refrigerant from flowing out of receiver tank 104, regardless of whether the refrigerant flows through the right side or left side of subcooler 102.

Process 300 may continue with step 320, in which refrigeration system 100 may cycle compressors as liquid refrigerant is charged into receiver tank 104. In some embodiments, multiple compressors have been enabled in step 314, and compressors may be cycled on and off to modulate suction pressure setpoint and minimize short cycling. Short cycling, in which equipment is started and stopped rapidly, may be detrimental to equipment lifespan and is energy inefficient. Refrigeration system 100 may use a rotational sequence to cycle compressors and reduce short cycling. Refrigeration system 100 may determine whether refrigerant levels have reached some predetermined threshold level in step 322. If refrigerant levels have reached a predetermined threshold level, process 300 may continue with step 324. Predetermined threshold levels may be user adjustable. For example, a predetermined threshold level may be 50% of receiver tank 104 capacity. In step 324, refrigeration system 100 may close liquid line charging solenoid valve 112. For example, once refrigerant levels reach 50%, refrigeration system 100 may disable the liquid line charging solenoid valve 112 to the flow of refrigerant to receiver tank 104. If refrigerant levels have not reached the predetermined threshold level, process 300 may continue to cycle compressors in step 320.

Process 300 may terminate with step 326, in which refrigeration system 100 notifies a user of the completion of the receiver pre-charge phase. In some embodiments, the notification may be transmitted to a user through communications interface 206. Phase manager 222 of FIG. 2 may set the phase of refrigeration system 100 to manage the phase in which refrigeration system 100 is currently operating. Once receiver tank 104 has been pre-charged with liquid refrigerant, the next phase may begin.

Figure 4:
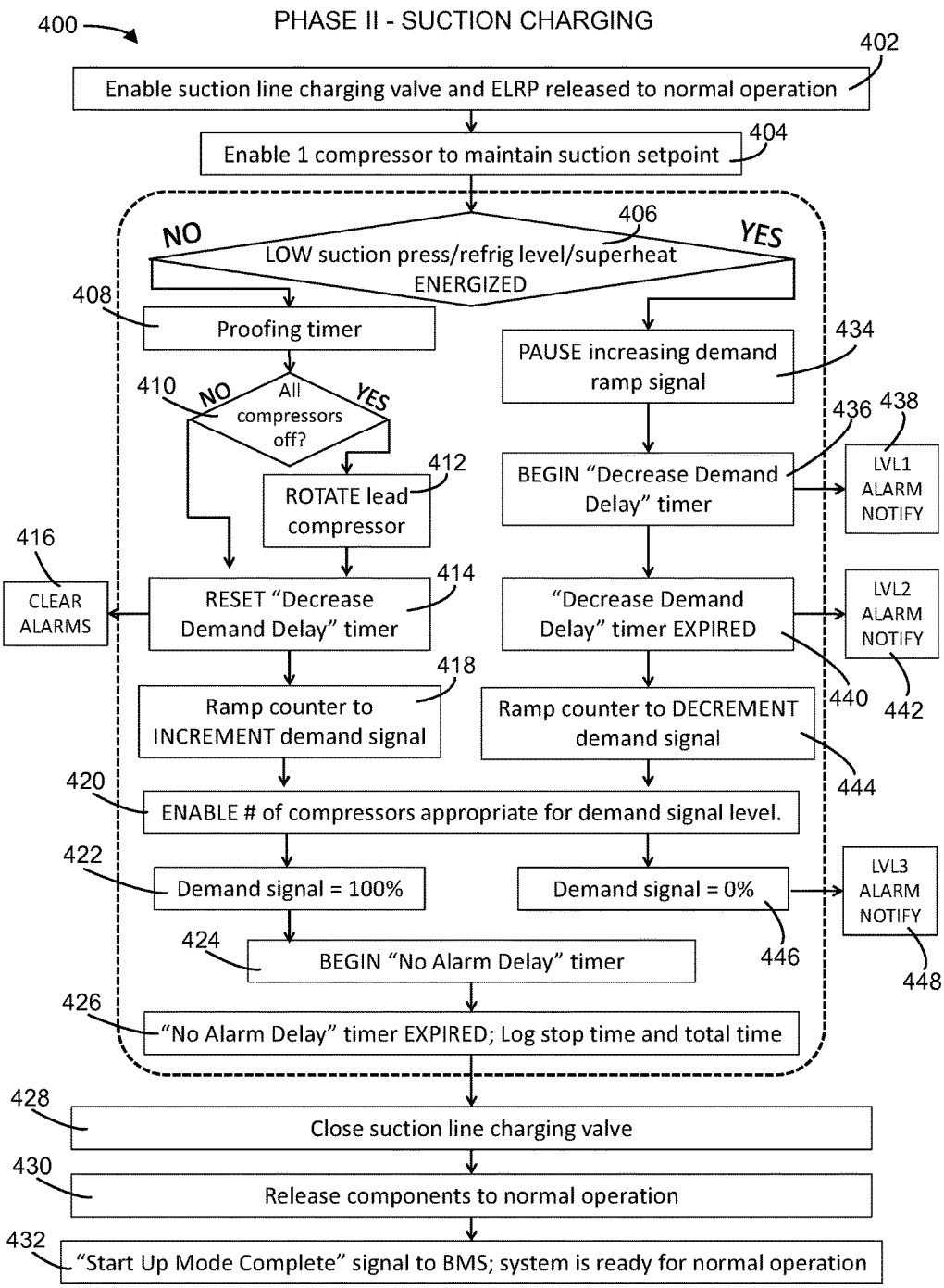
FIG. 4 is a flowchart of a process for charging the suction line of the refrigeration system of FIG. 1, according to an exemplary embodiment.

Referring now to FIG. 4, a process 400 in which the suction line of refrigeration system 100 is charged with liquid is shown, according to an exemplary embodiment. Process 400 may begin with step 402, in which refrigerant system 100 may enable the suction line charging valve 116 and release the liquid line regulating solenoid valve (ELPR) 114 to operate normally. Liquid line regulating valve 114 may not be adjustable, and may act as a restrictor, or bottleneck, to the flow of refrigerant. In other embodiments, liquid line regulating valve 114 may be adjustable (e.g., by refrigeration system controller 202) between an open position and a closed position. Suction line charging valve 116 may be equipped with an expansion device (e.g., suction line expansion valve 118) to increase charging performance and minimize the potential for liquid slugging.

Upon opening liquid line regulating valve 114 and suction line charging valve 116, process 400 may continue with step 404, in which a controller of refrigeration system 100 (e.g., controller 202) operates a single compressor of compressor assembly 108 to maintain the suction setpoint. The suction setpoint may be controlled by setpoint manager 220. Process 400 may continue with step 406, in which refrigeration system 100 may detect a low condition of the refrigerant. For example, refrigeration system 100 may detect low suction pressure, low superheat, low refrigerant temperature, low refrigerant flow rate, low refrigerant level, and/or any other condition of the refrigerant that is below a minimum threshold value. Step 406 may be performed by refrigerant condition detector 226 of FIG. 2. Refrigeration system 100 may continually check for low conditions of the refrigerant. Multiple low conditions may be detected. For example, refrigeration system 100 can detect low superheat and low suction pressure, and advance process 400 to step 434.

If a low condition of the refrigerant is not detected, process 400 may continue with step 408, in which refrigeration system 100 may begin a proofing timer. The proofing timer may be an embodiment of signal timer 230. In some embodiments, signal timer 230 may communicate with database 238 through communications interface 206. Signal timer 230 may store the start time or a timestamp in database 238.

Process 400 may continue to step 410, in which refrigeration system 100 determines whether any compressors in compressor assembly 108 are still operating. If no compressors in compressor assembly 108 are operating, process 400 will proceed to step 412 and rotate the lead compressor in compressor assembly 108. The rotational order of compressor cycling in refrigeration system 100 may prevent or reduce short cycling and improve performance and efficiency of refrigeration system 100.

If at least one compressor in compressor assembly 108 is operating when process 400 reaches step 410, the process will continue to step 414, in which refrigeration system 100 resets the demand signal delay timer. The demand signal delay timer may be an embodiment of signal timer 230. In some embodiments, signal timer 230 may communicate with database 238 through communications interface 206. Signal timer 230 may store the start time or a timestamp in database 238. After resetting the demand signal delay timer, process 400 may proceed to step 416, and clear any alarms relating to monitored refrigerant conditions. In some embodiments, step 416 may involve alarm manager 228 and refrigerant condition detector 226.

As compressor assembly 108 runs, process 400 may continue to step 418, in which refrigeration system 100 may begin a ramp counter 224 to increase the demand signal for system operation to full operating capacity. For example, ramp counter 224 may increase demand signal from 10% to 100%. The rate at which ramp counter 224 may increase the demand signal may be represented by a variable, "$R_{ramp\_up}$." In alternative embodiments, $R_{ramp\_up}$ may be expressed as a series of setpoints for the demand signal percentage. $R_{ramp\_up}$ may be set by a user, or it may be set automatically depending on various system conditions. For example, if the demand signal successfully increases at a rate of 5% per 30 minutes for a certain period of time without a detected fault (i.e., a low refrigerant condition), $R_{ramp\_up}$ may automatically increase to 10% per 30 minutes for the rest of the period that the demand signal is increasing.

In some embodiments, the time for the demand signal to reach 100% will exceed two hours. Increasing demand for system operation at increments allows refrigeration system 100 to ramp up to reduce strain on system components. As the demand signal increases, process 400 may proceed to step 420, and refrigeration system 100 may operate additional compressors in compressor assembly 108 in order to match the demand. Refrigeration system 100 may continue to operate additional compressors until the demand signal reaches 100%, in step 422.

If the demand signal and/or ramp counter has reached the desired level of system operation, refrigeration system 100 may begin a "No Alarm Delay" timer in step 424. The "No Alarm Delay" timer may be used to temporarily delay the system. In some embodiments, this timer may be a component of signal timer 230. Signal timer 230 may store timestamps or time data in database 238. The amount of time refrigeration system 100 delays while the timer runs may be predetermined by a user or calculated by refrigeration system 100. For example, the delay may be 15 seconds, 5 minutes, 30 minutes, etc. In some embodiments, the alarm is for low refrigerant conditions, such as those detected in step 406. In other embodiments, the alarm is for violations of other conditions of refrigeration system 100. The timestamp data collected in step 310 of FIG. 3 may be used to determine whether an alarm has occurred within a predetermined period of time. For example, referring now to FIG. 2, refrigeration system controller 202 may access database 238 through communications interface 206 to determine how long it has been since an alarm has occurred.

Process 400 continues to step 426, when the "No Alarm Delay" timer expires and it is confirmed that an alarm has not occurred within the predetermined period of time associated with the timer. At the expiration of the "No Alarm Delay" timer, signal timer 230 may store timestamps or time data in database 238. Process 400 may proceed to step 428, in which refrigeration system 100 may close suction line charging valve 116 and release subcooler expansion valve 115 to normal operation. Once suction line charging valve 116 has been closed, the flow of refrigerant to the suction line may stop. Refrigeration system 100 may then release its components to normal operation in step 430. For example, the compressors of compressor assembly 108 may operate normally to maintain system pressure. In some embodiments, refrigeration system 100 may release components from start-up controller 208. For example, refrigeration system 100 may alter priority of commands, moving start-up controller 208 behind normal operation controller 210. In other embodiments, refrigeration system 100 may cease to block commands from normal operation controller 210, allowing refrigeration system components 240 to receive commands from normal operation controller 210. Refrigeration system 100 may send start-up controller 208 into a standby mode to cease sending commands to refrigeration system components 240.

Finally, process 400 may conclude with step 432, in which refrigeration system 100 may transmit a signal to the building management system and/or BMS circuit controller 236 to indicate that start-up mode is complete, and that refrigeration system 100 is ready for normal operation. In some embodiments, refrigeration system controller 202 may transmit a signal to BMS circuit controller 236 through BMS interface 204. The signal may initiate a change in phase manager 222, which may indicate that the suction line charging phase is complete. In some embodiments, refrigeration system controller 202 may log times, for example, the amount of time refrigeration system 100 was stopped or the time refrigeration system 100 was in a start-up mode.

However, returning to step 406, if a low condition of the refrigerant is detected, process 400 may proceed with step 434 in order to resolve the condition. In step 434, a component of refrigeration system 100 (e.g., controller 202) may pause increasing the demand signal and/or ramp counter for system operation. For example, refrigeration system 100 may detect low refrigerant level and stop increasing the demand signal for system operation. The demand signal may have reached 60%, and ramp counter 224 may stop at 60% of total system capacity. Stopping ramp counter 224 may stop increasing demand on refrigeration system components 240 and prevent further stress on refrigeration system 100.

Process 400 may continue with step 436, in which refrigeration system 100 may start a demand signal delay timer. The amount of time the demand signal delay timer runs may be predetermined by a user or calculated by refrigeration system 100. For example, the delay may be 15 seconds, 5 minutes, 30 minutes, etc. The demand signal delay timer may be an embodiment of signal timer 230. In some embodiments, signal timer 230 may communicate with database 238 through communications interface 206. Signal timer 230 may store the start time or a timestamp in database 238. Once the demand signal delay timer is started, process 400 may proceed to step 438, when a Level 1 alarm is sent to the BMS. In some embodiments, the alarm may be activated by alarm manager 228.

The demand signal delay timer started in step 436 will run while the low condition of the refrigerant is detected. Proceeding to step 440, refrigeration system 100 may determine whether the demand signal has been delayed for longer than a predetermined amount of time, and thus the demand signal delay timer has expired. For example, refrigeration system 100 may determine the amount of time that the demand signal has been delayed by checking the time logged by signal timer 230. Refrigeration system 100 may calculate the amount of time that the demand signal has been delayed by accessing a start timestamp stored in database 238. For example, the predetermined amount of time may be 30 minutes. Once the demand signal delay timer has expired, process 400 may proceed to step 442, when a Level 2 alarm is sent to the BMS. A Level 2 alarm may indicate a problem of higher severity than a Level 1 alarm. In some embodiments, the alarm may be activated by alarm manager 228.

If the demand signal delay timer expires (i.e., the total delay time is determined to be longer than the threshold amount of time), process 400 may continue with step 444. Refrigeration system 100 may reverse ramp counter 224 to decrease the demand signal to refrigeration system 100. For example, if ramp counter 224 and/or the demand signal is at 65%, refrigeration system 100 may reverse ramp counter 224 to count down toward 0% to decrease the demand signal. Decreasing the demand signal may allow refrigeration system 100 to resolve low conditions of refrigeration system 100. Decreasing the demand signal can reduce the stress on refrigeration system 100, and may allow refrigeration system components 240 time to catch up and resolve low conditions of the refrigerant.

The rate at which ramp counter 224 may decrease the demand signal may be represented by a variable, "$R_{ramp\_down}$." In alternative embodiments, $R_{ramp\_down}$ may be expressed as a series of setpoints for the demand signal percentage. $R_{ramp\_down}$ may be set by a user, or it may be set automatically depending on various system conditions. For example, if the demand signal decreases at a rate of 5% per 30 minutes for a period of time and a critically low refrigerant condition is detected during that period, $R_{ramp\_down}$ may automatically increase to 10% per 30 minutes for the rest of the period so that a demand signal of 0% is reached more quickly. In some embodiments, the value of $R_{ramp\_up}$ may equal the value of $R_{ramp\_down}$, or both values may be calculated from the same system conditions. In other embodiments, the value of $R_{ramp\_up}$ may be fully independent from the value of $R_{ramp\_down}$.

As the demand signal decreases, process 400 may proceed to step 420, and refrigeration system 100 may operate fewer compressors in compressor assembly 108 in order to match the demand. Refrigeration system 100 may continue to operate fewer compressors until the demand signal reaches 0%, in step 446. Once the demand signal reaches 0%, a Level 3 alarm may be sent to the BMS in step 448. In some embodiments, the alarm may be activated by alarm manager 228. A Level 3 alarm is the highest severity alarm, and may require a user or technician to manually reset the system.

Once the low pressure, low refrigerant level, or low superheat condition has been reset, process 400 may revert to step 406. From there, process 400 proceeds in the same manner as if no low condition of refrigeration system 100 was ever detected. For example, in step 412, the lead compressor may be rotated to minimize short cycling, and in steps 418-422, controller 202 may restart the demand increase counter from its prior stopping point and gradually increase the demand signal until it reaches 100%. Process 400 culminates with the expiration of the "No Alarm Delay" timer in step 426, the closing of the suction line charging valve 116 in step 428, the release of refrigeration system components 240 in step 430, and the transmission of the signal to the BMS controller indicating the completion of the start up mode in step 432.

Figure 5:
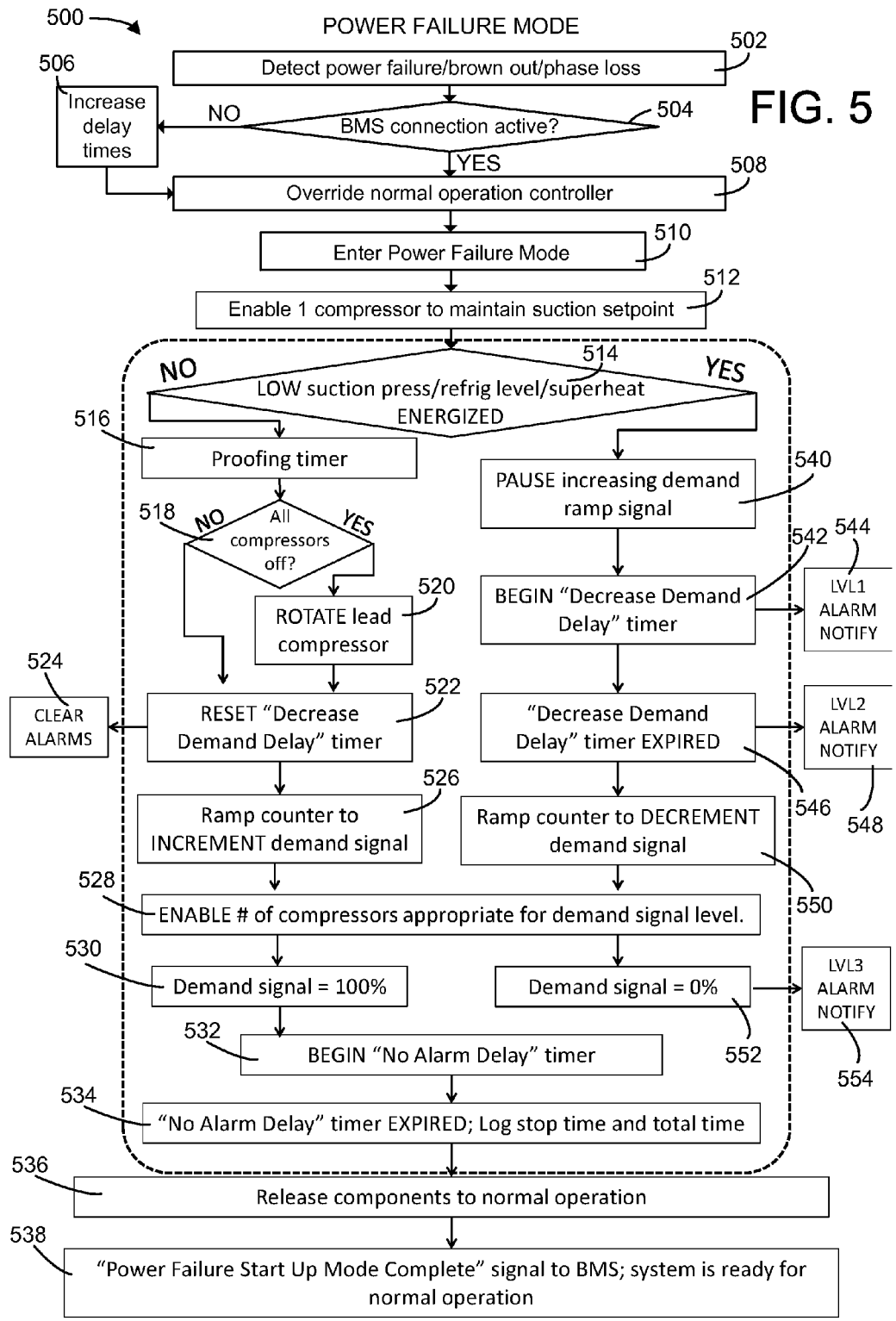
FIG. 5 is a flowchart of a process for restarting the system of FIG. 1 in the event of a power failure, brown out, or phase loss, according to an exemplary embodiment.

Referring now to FIG. 5, a process 500 for restarting refrigeration system 100 is shown, according to an exemplary embodiment. If, at any point in time, refrigeration system 100 experiences a power failure, brown-out, phase loss, etc., refrigeration system 100 may enter a power failure phase or mode, illustrated by process 500. Process 500 begins with step 502, in which refrigeration system 100 detects a power failure, brown-out, phase loss, etc. Any loss of connection with power or drop in power may trigger process 500. In some embodiments, a drop in power of an amount over a predetermined threshold amount may trigger process 500. Step 502 may be performed by power failure detector 232.

Process 500 may continue with step 504, in which refrigeration system 100 may determine whether the connection between refrigeration system 100 and a building management system is active. In some embodiments, the connection is BMS interface 204, and step 504 may be performed by connection status detector 214. If BMS interface 204 is not active, refrigeration system 100 may increase all delay times in step 506. For example, delay times may be doubled. In some embodiments, delay times may be increased by a predetermined amount of time. Increasing delay times may allow refrigeration system components 240 to catch up during the restart operation. Process 500 may continue with step 508.

If BMS interface 204 is active, process 500 may continue with step 508. Refrigeration system 100 may override normal operation controller 210. In some embodiments, refrigeration system controller 202 includes a start-up controller 208 which overrides normal operation controller 210. Refrigeration system controller 202 may simply send normal operation controller 210 into a standby mode. In some embodiments, refrigeration system controller 202 may block the signal from normal operation controller 210 to each of refrigeration system components 240. In other embodiments, refrigeration system controller 202 may set a priority for each command and/or message from start-up controller 208 over all controllers, such as normal operation controller 210.

Process 500 may continue with step 510, in which refrigeration system 100 enters a power failure mode. Step 510 is followed by step 512, in which a component of refrigeration system 100 (e.g., refrigeration system controller 202) operates a single compressor of compressor assembly 108 to maintain the suction setpoint. The suction setpoint may be controlled by setpoint manager 220. Process 500 may continue with step 514, in which refrigeration system 100 may detect a low condition of the refrigerant. For example, refrigeration system 100 may detect low suction pressure, low superheat, low refrigerant temperature, low refrigerant flow rate, low refrigerant level, and/or any other condition of the refrigerant that is below a minimum threshold value. Step 514 may be performed by refrigerant condition detector 226 of FIG. 2. Refrigeration system 100 may continually check for low conditions of the refrigerant. Multiple low conditions may be detected. For example, refrigeration system 100 can detect low superheat and low suction pressure, and advance process 500 to step 540.

If a low condition of the refrigerant is not detected, process 500 may continue with step 516, in which refrigeration system 100 may begin a proofing timer. The proofing timer may be an embodiment of signal timer 230. In some embodiments, signal timer 230 may communicate with database 238 through communications interface 206. Signal timer 230 may store the start time or a timestamp in database 238.

Process 500 may continue to step 518, in which refrigeration system 100 determines whether any compressors in compressor assembly 108 are still operating. If no compressors in compressor assembly 108 are operating, process 500 will proceed to step 520 and rotate the lead compressor in compressor assembly 108. The rotational order of compressor cycling in refrigeration system 100 may prevent or reduce short cycling and improve performance and efficiency of refrigeration system 100.

If at least one compressor in compressor assembly 108 is operating when process 500 reaches step 518, the process will continue to step 522, in which refrigeration system 100 resets the demand signal delay timer. The demand signal delay timer may be an embodiment of signal timer 230. In some embodiments, signal timer 230 may communicate with database 238 through communications interface 206. Signal timer 230 may store the start time or a timestamp in database 238. After resetting the demand signal delay timer, process 500 may proceed to step 524, and clear any alarms relating to monitored refrigerant conditions. In some embodiments, step 524 may involve alarm manager 228 and refrigerant condition detector 226.

As compressor assembly 108 runs, process 500 may continue to step 526, in which refrigeration system 100 may begin a ramp counter 224 to increase the demand signal for system operation to full operating capacity. For example, ramp counter 224 may increase demand signal from 10% to 100%. The rate at which ramp counter 224 may increase the demand signal may be represented by a variable, "$R_{ramp\_up}$." In alternative embodiments, $R_{ramp\_up}$ may be expressed as a series of setpoints for the demand signal percentage. $R_{ramp\_up}$ may be set by a user, or it may set automatically depending on various system conditions. For example, if the demand signal successfully increases at a rate of 5% per 30 minutes for a certain period of time without a detected fault (i.e., a low refrigerant condition), $R_{ramp\_up}$ may automatically increase to 10% per 30 minutes for the rest of the period that the demand signal is increasing.

In some embodiments, the time for the demand signal to reach 100% will exceed two hours. Increasing demand for system operation at increments allows refrigeration system 100 to ramp up to reduce strain on system components. As the demand signal increases, process 500 may proceed to step 528, and refrigeration system 100 may operate additional compressors in compressor assembly 108 in order to match the demand. Refrigeration system 100 may continue to operate additional compressors until the demand signal reaches 100%, in step 530.

If the demand signal and/or ramp counter has reached the desired level of system operation, refrigeration system 100 may begin a "No Alarm Delay" timer in step 532. The "No Alarm Delay" timer may be used to temporarily delay the system. In some embodiments, this timer may be a component of signal timer 230. Signal timer 230 may store timestamps or time data in database 238. The amount of time refrigeration system 100 delays while the timer runs may be predetermined by a user or calculated by refrigeration system 100. For example, the delay may be 15 seconds, 5 minutes, 30 minutes, etc. In some embodiments, the alarm is for low refrigerant conditions, such as those detected in step 514. In other embodiments, the alarm is for violations of other conditions of refrigeration system 100. The timestamp data collected in step 310 of FIG. 3 may be used to determine whether an alarm has occurred within a predetermined period of time. For example, referring now to FIG. 2, refrigeration system controller 202 may access database 238 through communications interface 206 to determine how long it has been since an alarm has occurred.

Process 500 continues to step 534, when the "No Alarm Delay" timer expires and it is confirmed that an alarm has not occurred within the predetermined period of time associated with the timer. At the expiration of the "No Alarm Delay" timer, signal timer 230 may store timestamps or time data in database 238. Process 500 may proceed to step 536, in which refrigeration system 100 may then release its components to normal operation. For example, the compressors of compressor assembly 108 may operate normally to maintain system pressure. In some embodiments, refrigeration system 100 may release components from start-up controller 208. For example, refrigeration system 100 may alter priority of commands, moving start-up controller 208 behind normal operation controller 210. In other embodiments, refrigeration system 100 may cease to block commands from normal operation controller 210, allowing refrigeration system components 240 to receive commands from normal operation controller 210. Refrigeration system 100 may send start-up controller 208 into a standby mode to cease sending commands to refrigeration system components 240.

Finally, process 500 may conclude with step 538, in which refrigeration system 100 may transmit a signal to the building management system and/or BMS circuit controller 236 to indicate that restart mode is complete, and that refrigeration system 100 is ready for normal operation. In some embodiments, refrigeration system controller 202 may transmit a signal to BMS circuit controller 236 through BMS interface 204. In some embodiments, refrigeration system controller 202 may log times, for example, the amount of time refrigeration system 100 was stopped or the time refrigeration system 100 was in a restart mode.

However, returning to step 514, if a low condition of the refrigerant is detected, process 500 may proceed with step 540 in order to resolve the condition. In step 540, refrigeration system 100 may pause increasing the demand signal and/or ramp counter for system operation. For example, a component of refrigeration system 100 (e.g., controller 202) may detect low refrigerant level and stop increasing the demand signal for system operation. The demand signal may have reached 60%, and ramp counter 224 may stop at 60% of total system capacity. Stopping ramp counter 224 may stop increasing demand on refrigeration system components 240 and prevent further stress on refrigeration system 100.

Process 500 may continue with step 542, in which refrigeration system 100 may start a demand signal delay timer. The amount of time the demand signal delay timer runs may be predetermined by a user or calculated by refrigeration system 100. For example, the delay may be 15 seconds, 5 minutes, 30 minutes, etc. The demand signal delay timer may be an embodiment of signal timer 230. In some embodiments, signal timer 230 may communicate with database 238 through communications interface 206. Signal timer 230 may store the start time or a timestamp in database 238. Once the demand signal delay timer is started, process 500 may proceed to step 544, when a Level 1 alarm is sent to the BMS. In some embodiments, the alarm may be activated by alarm manager 228.

The demand signal delay timer started in step 542 will run while the low condition of the refrigerant is detected. Proceeding to step 546, refrigeration system 100 may determine whether the demand signal has been delayed for longer than a predetermined amount of time, and thus the demand signal delay timer has expired. For example, refrigeration system 100 may determine the amount of time that the demand signal has been delayed by checking the time logged by signal timer 230. Refrigeration system 100 may calculate the amount of time that the demand signal has been delayed by accessing a start timestamp stored in database 238. For example, the predetermined amount of time may be 30 minutes. Once the demand signal delay timer has expired, process 500 may proceed to step 548, when a Level 2 alarm is sent to the BMS. A Level 2 alarm may indicate a problem of higher severity than a Level 1 alarm. In some embodiments, the alarm may be activated by alarm manager 228.

If the demand signal delay timer expires (i.e., the total delay time is determined to be longer than the threshold amount of time), process 500 may continue with step 550. In step 550, a component of refrigeration system 100 (e.g., controller 202) may reverse ramp counter 224 to decrease the demand signal to refrigeration system 100. For example, if ramp counter 224 and/or the demand signal is at 65%, refrigeration system 100 may reverse ramp counter 224 to count down toward 0% to decrease the demand signal. Decreasing the demand signal may allow refrigeration system 100 to resolve low conditions of refrigeration system 100. Decreasing the demand signal can reduce the stress on refrigeration system 100, and may allow refrigeration system components 240 time to catch up and resolve low conditions of the refrigerant.

The rate at which ramp counter 224 may decrease the demand signal may be represented by a variable, "$R_{ramp\_down}$" In alternative embodiments, $R_{ramp\_down}$ may be expressed as a series of setpoints for the demand signal percentage. $R_{ramp\_down}$ may be set by a user, or it may be set automatically depending on various system conditions. For example, if the demand signal decreases at a rate of 5% per 30 minutes for a period of time and a critically low refrigerant condition is detected during that period, $R_{ramp\_down}$ may automatically increase to 10% per 30 minutes for the rest of the period so that a demand signal of 0% is reached more quickly. In some embodiments, the value of $R_{ramp\_up}$ may equal the value of $R_{ramp\_down}$, or both values may be calculated from the same system conditions. In other embodiments, the value of $R_{ramp\_up}$ may be fully independent from the value of $R_{ramp\_down}$.

As the demand signal decreases, process 500 may proceed to step 528, and refrigeration system 100 may operate fewer compressors in compressor assembly 108 in order to match the demand. Refrigeration system 100 may continue to operate fewer compressors until the demand signal reaches 0%, in step 552. Once the demand signal reaches 0%, a Level 3 alarm may be sent to the BMS in step 554. In some embodiments, the alarm may be activated by alarm manager 228. A Level 3 alarm is the highest severity alarm, and may require a user or technician to manually reset the system.

Once the low pressure, low refrigerant level, or low superheat condition has been reset, process 500 may revert to step 514. From there, process 500 proceeds in the same manner as if no low condition of refrigeration system 100 was ever detected. For example, in step 518, the lead compressor may be rotated to minimize short cycling, and in steps 526-530, controller 202 may restart the demand increase counter from its prior stopping point and gradually increase the demand signal until it reaches 100%. Process 500 culminates with the expiration of the "No Alarm Delay" timer in step 534, the release of refrigeration system components 240 in step 536, and the transmission of the signal to the BMS controller indicating the completion of the start up mode in step 538.

The construction and arrangement of the elements of the refrigeration system and pressure control system as shown in the exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The background section is intended to provide a background or context to the invention recited in the claims. The description in the background section may include concepts that could be pursued, but are not necessarily ones that have been previously conceived or pursued. Therefore, unless otherwise indicated herein, what is described in the background section is not prior art to the description and claims and is not admitted to be prior art by inclusion in the background section.

What is claimed is:

1. A system for charging an evacuated refrigeration system with refrigerant after installation, the system comprising:
 a liquid line regulating valve;
 a liquid line charging valve;
 a suction line expansion valve;
 a suction line charging valve;
 a controller configured to:
  override normal operation of the refrigeration system;
  transmit a demand signal to the refrigeration system to enable partial system operation;
  operate the liquid line regulating valve and the liquid line charging valve, in response to the demand signal, to cause refrigerant to be initially introduced into an evacuated receiver tank;
  gradually increase the demand signal to a predetermined level of partial system operation, the predetermined level of partial system operation comprising a threshold level of a receiver tank capacity;
  release the liquid line charging valve to normal operation;
  operate the suction line expansion valve and the suction line charging valve, in response to the demand signal, to charge a suction line;
  gradually increase the demand signal to full system operation; and
  release the liquid line regulating valve, the suction line expansion valve, and the suction line charging valve to normal operation.

2. The system of claim 1, wherein the controller is further configured to cycle one or more compressors of the refrigeration system to control a suction pressure in the refrigeration system.

3. The system of claim 1, wherein the controller is further configured to monitor the refrigeration system for a low refrigerant condition.

4. The system of claim 3, wherein the low refrigerant condition comprises at least one of a low suction pressure, a low superheat reading, a low refrigerant temperature, a low refrigerant flow rate, and a low refrigerant level.

5. The system of claim 3, wherein the controller is further configured to:
 suspend the increase of the demand signal based on the low refrigerant condition;
 calculate a period of time for which the increase of the demand signal was suspended; and
 decrease the demand signal based on the low refrigerant condition and the period of time.

6. The system of claim 1, wherein the controller is further configured to:
 monitor the refrigeration system for a plurality of power source conditions comprising at least one of a power failure, a partial loss of power, and a phase loss; and
 restart operations based on the plurality of power source conditions.

7. The system of claim 1, wherein the controller is further configured to vary the demand signal based on a ramp rate value, wherein the ramp rate value is set based on at least one of a user input and a plurality of refrigerant conditions.

8. A method for charging an evacuated refrigeration system with refrigerant after installation, the method comprising:
 overriding normal operation of the refrigeration system;
 transmitting a demand signal to the refrigeration system to enable partial system operation;
 operating a liquid line regulating valve and a liquid line charging valve, in response to the demand signal, to cause refrigerant to be initially introduced into an evacuated receiver tank;
 gradually increasing the demand signal to a predetermined level of partial system operation, the predetermined level of partial system operation comprising a threshold level of a receiver tank capacity;

releasing the liquid line charging valve to normal operation;

operating a suction line expansion valve and a suction line charging valve, in response to the demand signal, to charge a suction line;

gradually increasing the demand signal to full system operation; and releasing the liquid line regulating valve, the suction line expansion valve, and the suction line charging valve to normal operation.

9. The method of claim 8, further comprising cycling one or more compressors of the refrigeration system to control a suction pressure in the refrigeration system.

10. The method of claim 8, further comprising monitoring the refrigeration system for a low refrigerant condition.

11. The method of claim 10, wherein the low refrigerant condition comprises at least one of a low suction pressure, a low superheat reading, a low refrigerant temperature, a low refrigerant flow rate, and a low refrigerant level.

12. The method of claim 10, further comprising:
suspending the increase of the demand signal based on the low refrigerant condition;
calculating a period of time for which the increase of the demand signal was suspended; and
decreasing the demand signal based on the low refrigerant condition and the period of time.

13. The method of claim 10, further comprising:
monitoring the refrigeration system for a plurality of power source conditions comprising at least one of a power failure, a partial loss of power, and a phase loss; and
restarting operations based on the plurality of power source conditions.

14. The method of claim 8, further comprising:
varying the demand signal based on a ramp rate value; and
setting a ramp rate value based on at least one of a user input and a plurality of refrigerant conditions.

15. A controller for a system for charging an evacuated refrigeration system with refrigerant after installation, the controller comprising:
a memory;
one or more processors configured to:
override normal operation of the refrigeration system;
transmit a demand signal to the refrigeration system to enable partial system operation;
operate the liquid line regulating valve and the liquid line charging valve, in response to the demand signal, to cause refrigerant to be initially introduced into an evacuated receiver tank;
gradually increase the demand signal to a predetermined level of partial system operation, the predetermined level of partial system operation comprising a threshold level of a receiver tank capacity;
release the liquid line charging valve to normal operation;
operate the suction line expansion valve and the suction line charging valve, in response to the demand signal, to charge a suction line;
gradually increase the demand signal to full system operation; and
release the liquid line regulating valve, the suction line expansion valve, and the suction line charging valve to normal operation.

16. The controller of claim 15, the one or more processors further configured to:
monitor the refrigeration system for a low refrigerant condition;
calculate a period of time for which the increase of the demand signal is suspended; and
suspend the increase of the demand signal based on the plurality of refrigerant conditions for the period of time.

17. The controller of claim 16, wherein the low refrigerant condition comprises at least one of a low suction pressure, a low superheat reading, a low refrigerant temperature, a low refrigerant flow rate, and a low refrigerant level.

18. The controller of claim 16, the one or more processors further configured to decrease the demand signal based on the low refrigerant condition and the period of time.

19. The controller of claim 15, the one or more processors further configured to:
monitor the refrigeration system for a plurality of power source conditions comprising at least one of a power failure, a partial loss of power, and a phase loss; and
restart operations based on the plurality of power source conditions.

20. The controller of claim 15, the one or more processors further configured to vary the demand signal based on a ramp rate value, wherein the ramp rate value is set based on at least one of a user input and a plurality of refrigerant conditions.

* * * * *